(12) United States Patent
Madan et al.

(10) Patent No.: US 9,489,312 B2
(45) Date of Patent: *Nov. 8, 2016

(54) HOST SIDE DEDUPLICATION

(71) Applicant: NetApp Inc., Sunnyvale, CA (US)

(72) Inventors: Anshul Madan, Brookline, MA (US);
James F. Lentini, Woburn, MA (US);
Michael N. Condict, Hurdle Mills, NC (US); Stephen M. Byan, Littleton, MA (US)

(73) Assignee: NetApp, Inc., Sunnyvale, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/134,108

(22) Filed: Dec. 19, 2013

(65) Prior Publication Data

US 2014/0136789 A1    May 15, 2014

Related U.S. Application Data

(63) Continuation of application No. 13/237,417, filed on Sep. 20, 2011, now Pat. No. 8,620,886.

(51) Int. Cl.
*G06F 17/30* (2006.01)
*G06F 12/08* (2016.01)
(Continued)

(52) U.S. Cl.
CPC ........... *G06F 12/0891* (2013.01); *G06F 3/067* (2013.01); *G06F 3/0608* (2013.01);
(Continued)

(58) Field of Classification Search
CPC ........... G06F 12/0813; G06F 11/1435; G06F 17/30902; G06F 12/0866; G06F 2212/312; G06F 3/0641; G06F 2211/1004; G06F 2211/1057; G06F 11/1453; G06F 11/1076; G06F 3/0605; G06F 3/0689; G06F 3/0608; G06F 2201/885; G06F 3/065; G06F 3/0656; G06F 17/30156; G06F 17/30067; G06F 17/3002; G06F 17/30215; G06F 17/30194; G06F 11/3037; G06F 17/30097

See application file for complete search history.

(56) References Cited

U.S. PATENT DOCUMENTS 7,539,710 B1    5/2009    Haustein et al.
7,747,584 B1    6/2010    Jernigan, IV
(Continued)

FOREIGN PATENT DOCUMENTS

EP        2012235 A2    1/2009
WO    2009112332 A2    9/2009
(Continued)

OTHER PUBLICATIONS

Byan S., et al., "Mercury: Host-side flash caching for the data center," Mass Storage Systems and Technologies (MSST), 2012 IEEE 28th Symposium on DigitalObject Identifier, 2012, pp. 1-12.
(Continued)

*Primary Examiner* — Srirama Channavajjala
(74) *Attorney, Agent, or Firm* — Nixon Peabody LLP; Khaled Shami

(57) ABSTRACT

One or more techniques and/or systems are provided for performing host side deduplication. Host side deduplication may be performed upon writeable data within a write request received at a host computing device configured to access data stored by a storage server. The host side deduplication may be performed at the host computing device to determine whether the writeable data is already stored by the storage server based upon querying a host side cache comprising data stored by a storage server and/or a data structure comprising unique signatures of data stored by the storage server. If the writeable data is stored by the storage server, then a deduplication notification excluding the writeable data may be sent to the storage server, otherwise a write command comprising the writeable data may be sent. Accordingly, unnecessary network traffic of redundant data already stored by the storage server may be reduced.

12 Claims, 9 Drawing Sheets

(51) Int. Cl.
 *G06F 17/00* (2006.01)
 *G06F 13/00* (2006.01)
 *G06F 15/16* (2006.01)
 *G06F 11/30* (2006.01)
 *G06F 3/06* (2006.01)

(52) U.S. Cl.
 CPC ......... *G06F3/0641* (2013.01); *G06F 11/3037* (2013.01); *G06F 13/00* (2013.01); *G06F 15/16* (2013.01); *G06F 17/00* (2013.01); *G06F 17/30* (2013.01); *G06F 17/30097* (2013.01); *G06F 17/30156* (2013.01); *G06F 17/30188* (2013.01); *G06F 17/30194* (2013.01)

(56) References Cited

U.S. PATENT DOCUMENTS

| | | | |
|---|---|---|---|
| 7,818,495 B2 * | 10/2010 | Tanaka | G06F 3/0608 711/103 |
| 7,873,809 B2 | 1/2011 | Kano | |
| 7,921,077 B2 | 4/2011 | Ting et al. | |
| 8,135,918 B1 | 3/2012 | Yueh | |
| 8,407,190 B2 * | 3/2013 | Prahlad | G06F 17/3002 707/692 |
| 8,407,191 B1 * | 3/2013 | Nanda | G06F 17/30156 707/654 |
| 8,620,886 B1 * | 12/2013 | Madan | G06F 17/00 707/697 |
| 2002/0004917 A1 * | 1/2002 | Malcolm et al. | 714/4 |
| 2005/0193165 A1 * | 9/2005 | Sakaguchi et al. | 711/113 |
| 2006/0059207 A1 * | 3/2006 | Hirsch | G06F 11/1453 |
| 2008/0005141 A1 * | 1/2008 | Zheng | G06F 3/0608 |
| 2008/0104443 A1 | 5/2008 | Akutsu et al. | |
| 2008/0244172 A1 | 10/2008 | Kano | |
| 2008/0282047 A1 | 11/2008 | Arakawa et al. | |
| 2009/0063528 A1 | 3/2009 | Yueh | |
| 2009/0089483 A1 * | 4/2009 | Tanaka | G06F 3/0608 711/103 |
| 2009/0132619 A1 * | 5/2009 | Arakawa | G06F 3/0605 |
| 2009/0204650 A1 | 8/2009 | Wong et al. | |
| 2009/0217091 A1 | 8/2009 | Miyamoto et al. | |
| 2009/0254609 A1 * | 10/2009 | Wideman | G06F 3/0608 709/203 |
| 2009/0268903 A1 * | 10/2009 | Bojinov | G06F 3/0622 380/45 |
| 2010/0070715 A1 * | 3/2010 | Waltermann | G06F 12/0868 711/129 |
| 2010/0077013 A1 * | 3/2010 | Clements | G06F 17/30156 707/822 |
| 2010/0199065 A1 | 8/2010 | Kaneda | |
| 2010/0250858 A1 * | 9/2010 | Cremelie | G06F 12/08 711/136 |
| 2011/0035541 A1 | 2/2011 | Tanaka et al. | |
| 2011/0138144 A1 | 6/2011 | Tamura et al. | |
| 2011/0208909 A1 | 8/2011 | Kawaguchi | |
| 2011/0238634 A1 | 9/2011 | Kobara | |
| 2012/0233417 A1 | 9/2012 | Kalach et al. | |
| 2012/0233429 A1 | 9/2012 | Benhase et al. | |

FOREIGN PATENT DOCUMENTS

| | | |
|---|---|---|
| WO | 2011075610 A1 | 6/2011 |
| WO | 2013056220 A1 | 4/2013 |
| WO | WO 2013/056220 * | 4/2013 |

OTHER PUBLICATIONS

Zhengda Z., et al., "A Novel Data Redundancy Scheme for Deduplication Storage System," IEEE, 3rd International symposium onKnowledge acquistion and modeling, 2010, pp. 293-296.

* cited by examiner

HOST SIDE DEDUPLICATION

RELATED APPLICATION(S)

This application is a continuation of U.S. application Ser. No. 13/237,417, filed on Sep. 20, 2011, which has issued as U.S. Pat. No. 8,620,886, entitled "HOST SIDE DEDUPLICATION", at least some of which may be incorporated herein.

FIELD

This instant disclosure pertains to performing host side deduplication to reduce network traffic and bandwidth utilization, and to reduce processing operations that would otherwise have to be performed by a recipient storage server.

BACKGROUND

A network storage environment may comprise one or more storage servers configured to provide host computing devices with access to data stored on storage devices accessible from the respective storage servers. In particular, a host computing device may connect to a storage server that may provide the host computing device with access to data stored on storage devices that are accessible to and/or managed by the storage server. For example, a user may desire to startup a virtual machine on a desktop host computing device using a virtual machine hosting application. The virtual machine hosting application may be configured to retrieve virtual machine data of the virtual machine from a network storage environment within which the virtual machine data may be stored. In particular, the virtual machine hosting application may access a storage server. The storage server may provide the virtual machine hosting application with access to the virtual machine data stored across one or more storage devices accessible to storage server.

Unfortunately, storage servers may store a significant amount of duplicate (e.g., redundant) data within storage devices that the respective storage servers access. Thus, conventional storage servers may perform deduplication to mitigate storage of duplicate data. That is, a storage server may comprise deduplication functionality (e.g., programming) to detect whether writeable data from a host computing device that is to be written to a storage device is already stored by the storage server (on a storage device). It may be appreciated that writeable data and/or the like as used herein may be thought of as data that is to be written (e.g., write data). If the writeable data is not already stored by the storage server, then the storage server may store the writeable data within a destination location (e.g., storage device) of the writeable data. If the writeable data is already stored within a storage device, then the storage server may merely store a reference within the destination location that points to a source location (e.g., other (or same) storage device) already comprising the writeable data. It may be appreciated that the reference may be relatively small compared to the writeable data. For example, a user on a host computing device may send a write command associated with 2.5 GB of virtual machine writeable data to a storage server. Before storing the large amount of writeable data, the storage server may determine whether the virtual machine writeable data is already stored within one or more storage devices accessible to the storage server. If the virtual machine writeable data is already stored by the storage server, then the storage server may merely store a reference with a size of merely a few kilobytes pointing to a source location of the virtual machine data already stored by the storage server. In this way, storage of redundant data may be reduced to enhance network storage capacity utilization by the storage server (e.g., a reference with a size of a few kilobytes may be stored in place of a 2.5 GB file). Such operations may have a significant impact on large scale network storage environments where storage servers may store data within a plurality of storage devices for a significant number of host computing devices (e.g., a storage server may store over a thousand virtual machines across hundreds of storage devices, where a significant amount of virtual machine data may overlap and/or result in redundant data (e.g., many of the virtual machines may comprise similar operating system data, file system data, etc.)).

The storage server may perform deduplication through a variety of deduplication techniques. In one example, the storage server may compute a signature of writeable data received from a host computing device (e.g., the storage server may compute a hash signature from the writeable data to uniquely identify the writeable data). The storage server may compare the signature of the writeable data with signatures of data already stored by the storage server (e.g., the storage server may maintain a data structure, such as an index, of signatures computed for data already stored by the storage server on storage devices). In another example, the storage server may compute the signature of the writeable data and perform a byte-by-byte comparison, which may mitigate false positives occurring from collisions (e.g., hash function collision, signature function collision, etc.) where different data may be hashed into the same signature. In this way, the storage server may perform deduplication upon data received from the host computing device to mitigate storage of redundant data.

SUMMARY

The disclosure relates to one or more techniques and/or systems that perform host side deduplication. Deduplication may be performed by a host computing device before sending a storage data command to a storage device. Performing host side deduplication may offload deduplication processing from the storage server to host computing devices in order to free up processing resources of the storage server (e.g., server side deduplication may consume a significant amount of resources of a processor of a server due to the number of host computing devices that may be serviced by a storage server). Additionally, performing host side deduplication may mitigate unnecessary network traffic caused by transfer of redundant data already stored by the storage server. For example, in the absence of host side deduplication the host would send writable data to the storage server and allow the storage server to determine whether the writable data is redundant (and thus need not be stored again). With host side deduplication, however, the host computing device may merely send a deduplication notification, as opposed to redundant writeable data, to the storage server upon detecting that the writeable data is already stored by the storage server (e.g., the deduplication notification may comprise merely a few kilobytes of data, whereas the writeable data may comprise gigabytes or more of data, thus consuming less bandwidth).

In one example of host side deduplication, a host computing device may be configured to access data stored by a storage server (e.g., within one or more storage devices accessible to the storage server). The host computing device may receive a write request, which may be associated with writeable data and/or a destination location for the storage server. It may be appreciated that the write request may be received from various sources, such as, for example, the host computing device, an application executing on the host computing device, and/or other applications with access to data associated with the host computing device. For example, a user of a word processing application on the host computing device may request to save a text document to a user folder accessible on a storage network (e.g., the user folder may be stored on a storage device connected to the storage server that provides the host computing device with access to the user folder).

The host computing device may perform host side deduplication upon the writeable data. In one example, the host computing device may perform a function, such as a low quality (e.g., computationally inexpensive, non-cryptographic, etc.) hash function, upon (e.g., some or all of) the writeable data to create a signature that may be compared with a data structure index that addresses content within a host side cache (e.g., the data structure index may comprise low quality hash function signatures of data stored within the host side cache, where the data within the host side cache may correspond to instances of data stored by the storage server). For example, the data structure index may be queried with the signature to determine whether the signature is specified within the data structure index. If the signature is specified within the data structure index, then a byte-by-byte comparison may be performed between the writeable data and data indexed by the signature in the host side cache to determine whether the writeable data is stored within the host side cache (e.g., the byte-by-byte comparison may be performed to address false positives that may arise from the low quality hash function where different data may be hashed into the same signature). If the data is stored in the host side cache, then a deduplication notification may be sent to the storage server, otherwise a write command may be sent to the storage server. In another example, the host computing device may maintain a data structure comprising signatures (e.g., hash signatures, such as cryptographic hash signatures, uniquely identify data) associated with data stored by the storage server (e.g., the index may comprise signatures of data stored by the storage server that the host computing device frequently accesses and/or has accessed recently). It may be appreciated that data structure and/or the like as used herein may comprise an index, table, matrix and/or any other formulation, manner, structure, etc. within which one or more signatures may be stored (e.g., to allow for subsequent retrieval and/or comparison, etc.). The host computing device may compute a signature, such as cryptographic hash signatures, of (e.g., some or all of) the writeable data. The host computing device may query the data structure with the signature to determine whether the signature is specified within the data structure (e.g., a cryptographic hash signature comparison may be performed). If the signature is specified within the data structure, then the writeable data may already be stored by the storage server. If the signature is not specified within the data structure, then the writeable data may not already be stored by the storage server. It may be appreciated that a cryptographic hash function may be performed to generate a trusted signature that may be unique, such that different data may not have been hashed into the same signature (e.g., a byte-by-byte comparison may be skipped because of the trustworthiness, uniqueness, etc. of the cryptographic hash function).

If the signature is not specified within the data structure (e.g., the writeable data may not be stored by the storage server), then a write command may be sent to the storage server. The write command may comprise the writeable data and/or other information, such as the destination location for the writeable data.

If the signature is specified within the data structure (e.g., the writeable data may be stored by the storage server), then a deduplication notification may be sent to the storage server. The deduplication notification may exclude the writeable data, which may mitigate unnecessary network traffic. In one example, the deduplication notification may comprise an instruction for the storage server to create a reference pointer within a destination location associated with the write request, where the reference pointer references a source location comprising an instance of the writeable data (already) stored by the storage server. In this way, the storage server may merely store a reference pointer of a few kilobytes as opposed to storing the writeable data that may consume significantly more storage resources. In another example, the deduplication notification may comprise an instruction for the storage server to copy the writeable data from the source location comprising the instance of the writeable data stored by the storage server to the destination location associated with write request (e.g., duplication of the writeable data may be desired for redundancy considerations). In another example, a deduplication result set comprising the result of the deduplication may be provided from the host computing device to the storage server (e.g., a write command, a deduplication notification, and/or portions of the writeable data that may not already be stored by the storage server). In this way, the host computing device may perform host side deduplication to offload deduplication processing from the storage server and/or mitigate unnecessary network traffic of redundant data.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
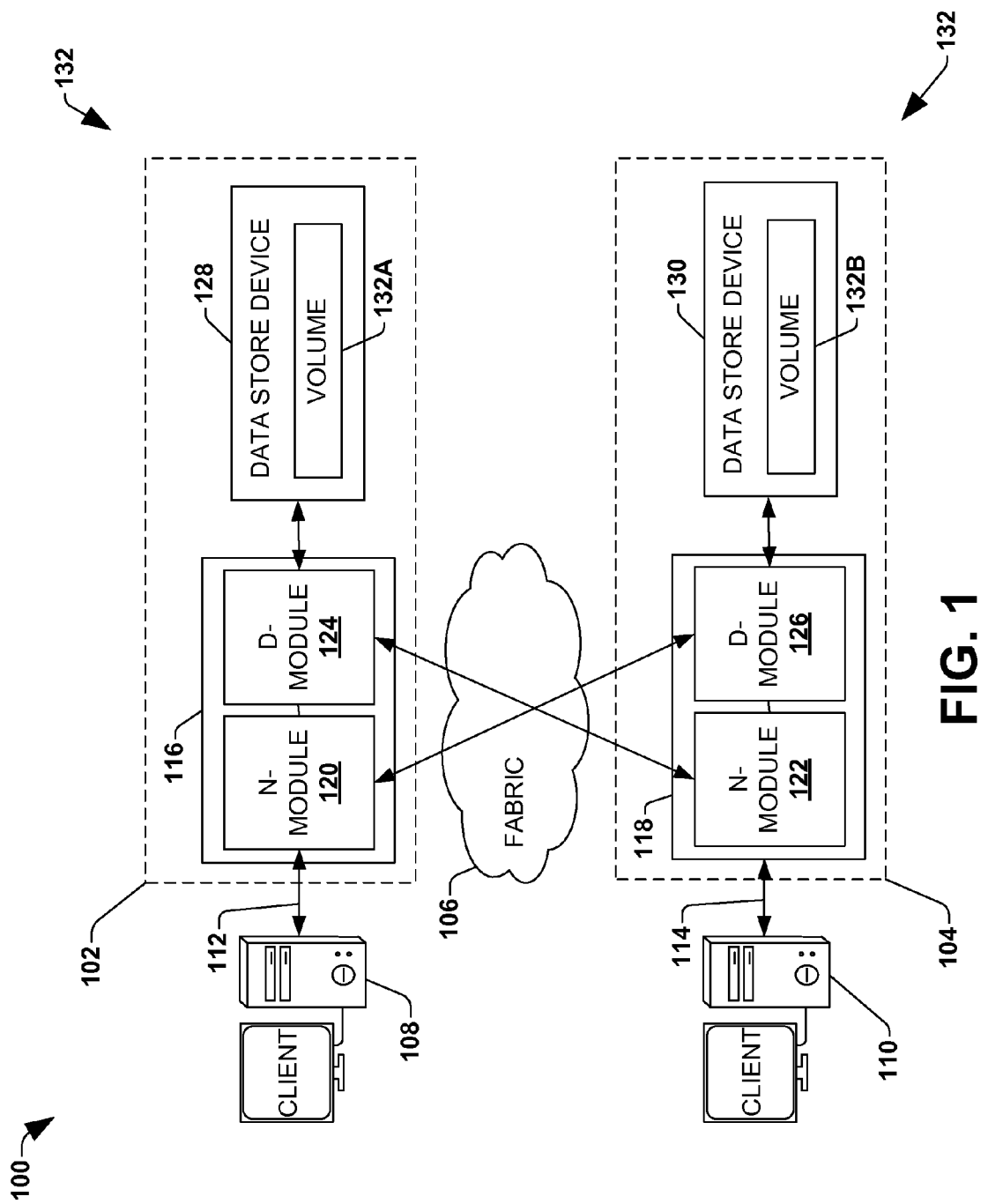
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

Currently, server side deduplication may be implemented by storage servers within a network storage environment to mitigate storage of redundant data by the storage servers. Generally, for a storage server to perform server side deduplication upon writeable data from a host computing device, the writeable data is transferred across a network from the host computing device to the storage server. Thus, unnecessary redundant data may be transferred across the network, which may consume considerable network bandwidth. Additionally, the storage server may be burdened by the amount of server side deduplication processing associated within servicing the (many) host computing devices within the network storage environment.

Accordingly, it may be advantageous to perform host side deduplication at the host computing device. In one example, writeable data associated with a write request may be compared with a host side cache comprising instances of data stored by the storage server. In another example, a signature of the writeable data may be computed and compared with a data structure, such as an index, comprising signatures of data stored by the storage server. A deduplication result set associated with the host side deduplication may be sent to the storage server, which may comprise write commands for writeable data not stored by the storage server and/or deduplication notifications for writeable data already stored by the storage server. Host side deduplication may offload deduplication processing from a storage server and may mitigate transfer of redundant writeable data across a network from the host computing device to the storage server. In this way, if a host computing device detects that writeable data is already stored by the storage server, then the host computing device may merely send a deduplication notification to the storage server. The deduplication notification may exclude the writeable data already stored by the storage server, which may mitigate transfer of redundant writeable data across the network.

Figure 2:
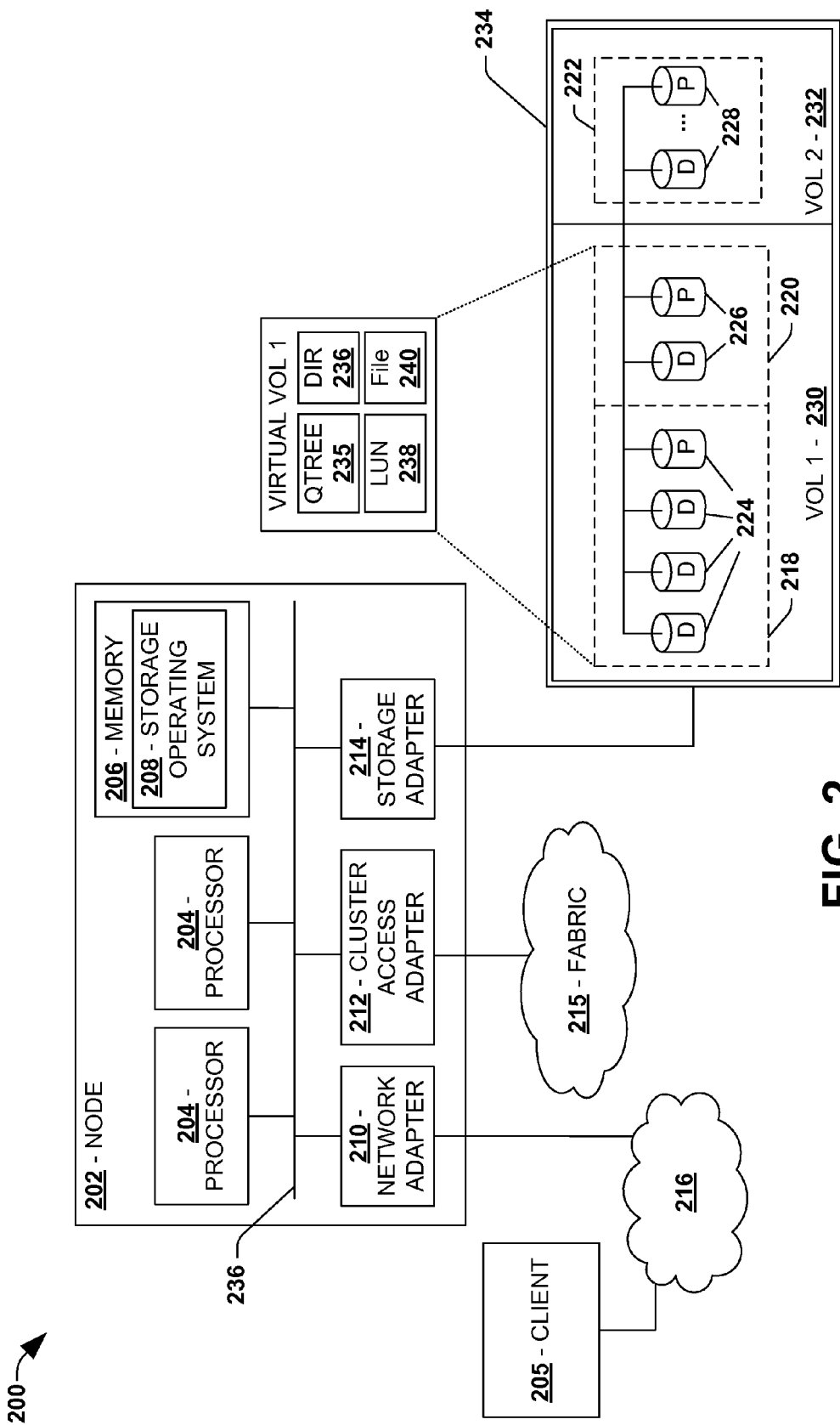
FIG. 2 is a component block diagram illustrating an example data storage system in accordance with one or more of the provisions set forth herein.

To provide context for host side deduplication, FIG. 1 illustrates a clustered network environment 100 (e.g., a network storage environment), and FIG. 2 illustrates an embodiment of a data storage system 200 (e.g., comprising a storage server) that may be implemented to store and manage data for host computing devices configured to perform host side deduplication to mitigate network traffic within the clustered network environment 100. It may be appreciated, however, that the techniques described herein may be implemented within the clustered network environment 100, a non-cluster network environment, and/or a variety of other computing environments to mitigate network usages. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that host side deduplication may be implemented within clustered network environment 100. For example, a host computing device (e.g., clients 108, 110) may comprise a host deduplication component configured to perform host side deduplication before sending storage data commands to a storage server (e.g., node 116, 118). Host side deduplication may mitigate unnecessary network traffic over the storage network connections 112, 114 (e.g., data already stored by nodes 116, 118 within data storage 128, 130 may not be retransmitted over network connections 112, 114 (e.g., excluded from deduplication notifications from clients 108, 110 to nodes 116, 118)).

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provide access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that host side deduplication may be implemented between a host computing device (e.g., client 205) and a storage server (e.g., node 202). For example, client 205 may comprise a host deduplication component configured to perform host side deduplication before sending storage data commands to node 202. Host side deduplication may mitigate unnecessary network traffic over the network connection 216 (e.g., data already stored by node 202 within data storage device 234 may not be retransmitted over network connection 216 (e.g., excluded from deduplication notifications from the client 205 to node 202)).

Figure 3:
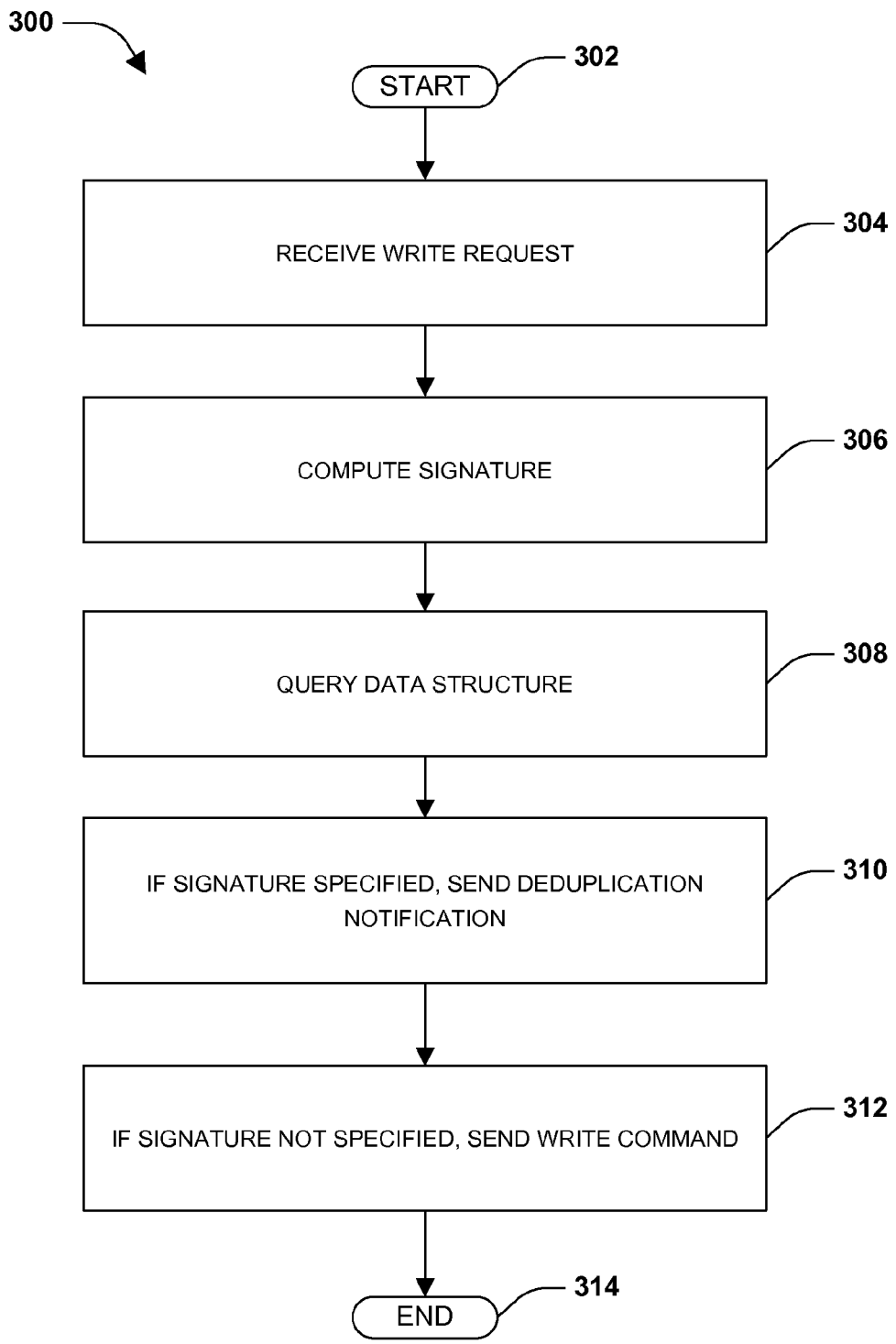
FIG. 3 is a flow chart illustrating an exemplary method of performing host side deduplication.

One embodiment of performing host side deduplication is illustrated by an exemplary method 300 in FIG. 3. At 302, the method starts. At 304, a write request may be received at a host computing device configured to access data stored by a storage server. For example, a user of a photo application may attempt to store a photo within a network storage environment, such as within a storage device accessible to the storage server. The write request may be associated with writeable data (e.g., the photo that is to be stored) and/or a destination location (e.g., a folder within the storage device).

Host side deduplication may be performed upon the writeable data at the host computing device before a storage data command is sent to the storage server from the host computing device. In one example, a signature for the writeable data may be computed, at 306. The signature may be an identifier, such as a hash signature uniquely identifying the writeable data. For example, a cryptographic hash function may be performed to generate a trusted signature that may be unique, such that different data may not have been hashed into the same signature (e.g., a byte-by-byte comparison may be skipped because of the cryptographic hash function). It may be appreciated that, although described with respect to a method here, such hashing may likewise be practiced in one or more systems mentioned herein. At 308, the signature may be used to query a data structure, such as an index, comprising one or more signatures associated with data stored by the storage server (e.g., data accessed by and/or accessible to the host computing device). To reduce the size of the data structure and/or improve query time, signatures of data accessed by the host computing device outside a threshold time frame (e.g., data last accessed over 10 days from the current date) and/or data accessed by the host computing device below a threshold frequency (e.g., data accessed less than two times within 3 days from the current date) may be excluded from the data structure. In one example, the data structure may be derived from a host side cache comprising instances of data stored by the storage server. In this way, the data structure may be queried to determine whether the signature is specified within the data structure. If the signature is specified within the data structure, then the writeable data may already be stored by the storage server (e.g., the writeable data may be considered redundant data). If the signature is not specified within the data structure, then the writeable data may not already be stored by the storage server (e.g., on a storage device under the purview of the storage server). It may be appreciated that some or all of the data structure may be stored on the host and/or elsewhere.

If the signature is specified within the data structure, then a deduplication notification may be sent to the storage server, at 310. The deduplication notification may comprise one or more storage server instructions, and may exclude the writeable data because the storage server may already store the writeable data. Sending the deduplication notification without the redundant writeable data may reduce unnecessary network traffic.

In one example, the deduplication notification may comprise an instruction for the storage server to create a reference pointer within the destination location associated with the write request. The reference pointer may reference a source location comprising an instance of the writeable data stored by the storage server. In this way, storage resources may be conserved by merely storing a small reference in place of storing redundant data. It may be appreciated that in one example, the deduplication notification may be implemented through a SCSI EXTENDED XCOPY command and/or a NFS server-side copy command (e.g., the host computing device may issue a COPY command, excluding redundant writeable data, to the storage server, which may instruct the storage server to create the reference pointer in the destination location).

In another example, the deduplication notification may comprise an instruction for the storage server to copy the writeable data from the source location to the destination location (e.g., the writeable data may be copied for redundancy considerations). In another example, if the signature is specified within the data structure and the destination location corresponds to the source location, then neither the deduplication notification nor the write command may be sent because the storage server may already store the writeable data in the destination location (e.g., the photo is already stored in the folder).

In one example, the data structure may be updated based upon the deduplication notification. For example, the data structure may be updated to indicate that the instance of the writeable data stored by the storage server may have been accessed (e.g., an expiration time associated with the signature specified within the data structure may be undated, which may be utilized when maintaining the data structure, such as determining when to remove old/stale signatures, for example).

If the signature is not specified within the data structure, then a write command may be sent to the storage server, at 312. The write command may comprise the writeable data because the writeable data may not be stored by the storage server. The write command may comprise an instruction for the storage server to write the writeable data to the destination location. Because the storage server may store the writeable data in the destination location, the data structure may be updated based upon the write command (e.g., a signature for the writeable data may be specified within the data structure). Thus, future write requests associated with the writeable data may result in deduplication notifications as opposed to write commands because a signature for the writeable data may be specified within the data structure. In this way, host side deduplication may be performed at the host computing device.

In another example of host side deduplication, a host side cache may be associated with the host computing device (e.g., a non-volatile cache). The host side cache may comprise one or more instances of data stored by the storage server (e.g., data frequently accessed and/or recently accessed by the host computing device). Cache consistency may be maintained between the host side cache and the storage server so that the host side cache does not become stale (e.g., cache consistency may be maintained by adding, deleting, and/or modifying data at the host side cache, such that the host side cache may comprise up-to-date data stored at the storage server). The writeable data may be used to query the host side cache to determine whether the writeable data is stored within the host side cache (e.g., a byte-by-byte comparison). In particular, a low quality hash function, for example, may be performed upon the writeable data to produce a query input for a data structure index addressing content within the host side cache (e.g., a content addressable table mapping a hash of contents within the host side cache to data blocks). That is, the data structure index addressing content within the host side cache may be queried using a low quality (e.g., computationally inexpensive, non-cryptographic, etc.) hash of the writeable data to determine whether the data is stored within the host side cache. To address potential false positives (e.g., that may occur where multiple (different) data may have been hashed to the same hash value), a byte-by-byte comparison may be performed based upon the results on the query within the data structure index (e.g., a byte-by-byte comparison may be performed between at least some of the writeable data and at least some of the data within the host side cache corresponding to the result of the query within the data structure index, which may validate that the data within the host side cache corresponds to the writeable data). It may be appreciated that, although described with respect to a method here, such hashing may likewise be practiced in one or more systems mentioned herein. If the writeable data is stored within the host side cache, then the deduplication notification may be sent to the storage server. If the writeable data is not stored within the host side cache, then the write command may be sent to the storage server.

In another example of host side deduplication, the writeable data may comprise one or more data blocks (e.g., a 2 GB file may be represented as two thousand 1 MB data blocks). Because the writeable data may comprise a large amount of data (e.g., a 2 GB file), it may be advantageous to compute a signature of merely a portion of the writeable data as opposed to the entire writeable data. Accordingly, the signature may comprise a first data block signature associated with a first data block of the writeable data (e.g., the first data block may comprise the entire writeable data or a portion thereof). It may be appreciated that a size of the first data block may range from the size of the entire writeable data to merely a portion of the writeable data (e.g., a 4 KB data block of a 2 GB writeable data file). The first data block signature may be compared to one or more data block signatures specified within the data structure (e.g., the signatures specified within the data structure may comprise data block signatures as opposed to or in addition to signatures for entire writable data). If the first data block signature corresponds to a second data block signature specified within the data structure, then a byte-by-byte comparison between the first data block of the writeable data and an instance of a second data block associated with the second data block signature may be performed (e.g., the instance of the second data block may be maintained in a host side cache). In this way, if the byte-by-byte comparison (e.g., yields a match and thus) indicates that the storage server may already store the writeable data and/or the first data block of the writeable data, then a deduplication notification may be sent to the storage server, otherwise a write command may be sent to the storage server (e.g., the deduplication notification and/or the write command may correspond to the writeable data or merely the first data block). At 314, the method ends.

Figure 4:
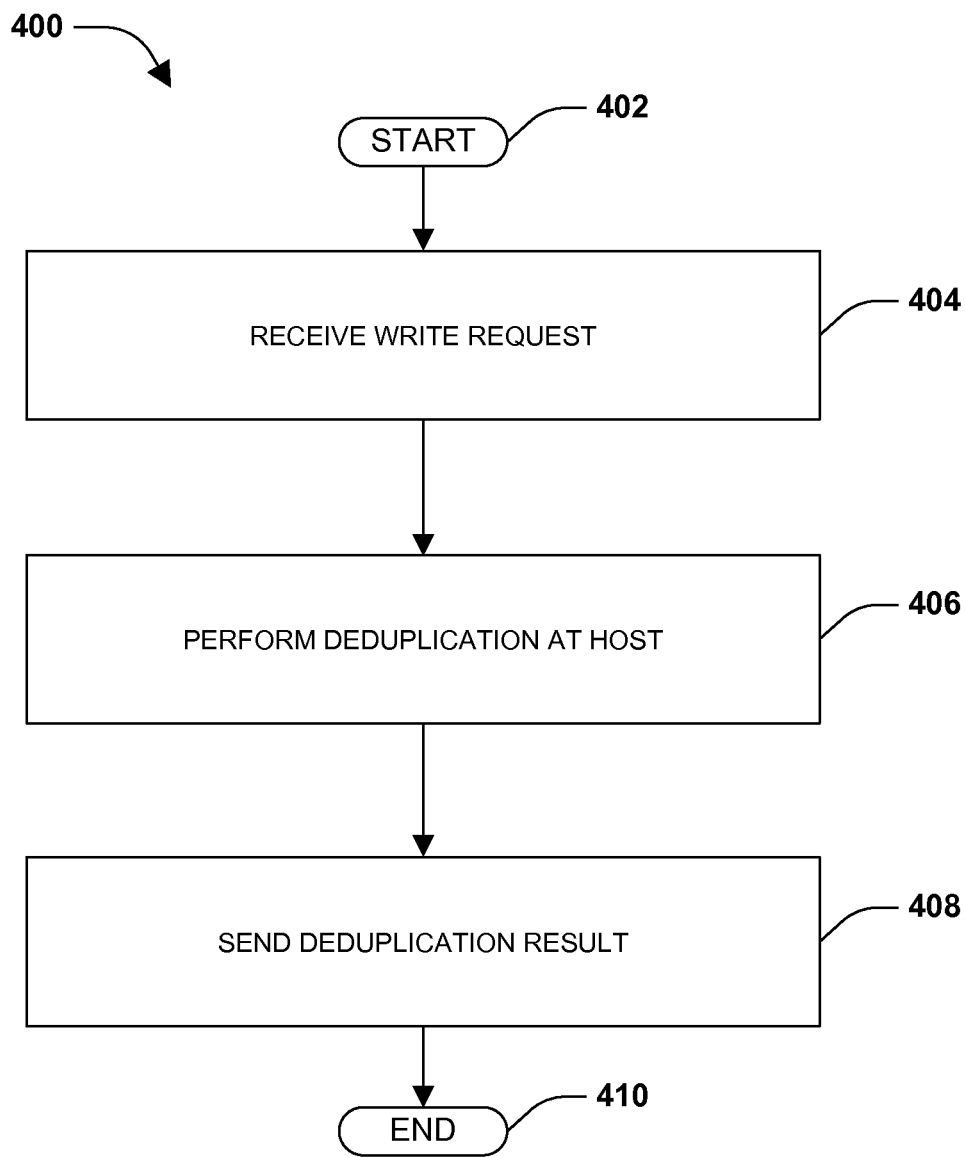
FIG. 4 is a flow chart illustrating an exemplary method of performing host side deduplication.

One embodiment of performing host side deduplication is illustrated by an exemplary method 400 in FIG. 4. At 402, the method starts. At 404, a write request may be received at a host computing device configured to access data stored by a storage server. The write request may be associated with writeable data (e.g., a first portion of writeable data, such as a first text document, and a second portion of writeable data, such as a second text document) and/or a destination location.

At 406, deduplication may be performed at the host computing device upon writeable data associated with the write request to create a deduplication result set. The deduplication may comprise determining whether an instance of at least a portion of the writeable data is stored by the storage server (e.g., a determination as to whether the storage server has already stored a copy of the first text document and/or a copy of the second text document). In one example of performing deduplication, the writeable data may be used to query a host side cache to determine whether the writeable data is stored within the host side cache. The host side cache may comprise one or more instances of data stored by the storage server. If the writeable data is stored within the host side cache, then the writeable data may be stored by the storage server, otherwise the writeable data may not be stored by the storage server. In another example of performing deduplication, a signature for the writeable data may be computed. The signature may be used to query a data structure to determine whether the signature is specified within the data structure. The data structure may comprise one or more signatures associated with data stored by the storage server. If the signature is specified within the data structure, then the writeable data may be stored by the storage server, otherwise the writeable data may not be stored by the storage server. In this way, a deduplication result set may be created.

It may be appreciated that the writeable data may comprise one or more portions of data, such as a first portion (e.g., a first text document), a second portion (e.g., a second text document), and/or other portions. It may be appreciated that some portions may be already stored by the storage server, while other portions may not. Thus, a deduplication result set may be associated with one or more portions of writeable data already stored by the storage server and/or one or more portions of writeable data not already stored by the storage server.

In one example of creating the deduplication result set, upon performing deduplication, it may be determined that a first instance of a first portion of the writeable data is stored by the storage server (e.g., the storage server has already stored a copy of the first text document). Thus, the first portion may be excluded from the deduplication result set, and a deduplication notification for the first portion may be specified within the deduplication result set (e.g., the deduplication result set may exclude the first text document, and may comprise an instruction for the storage server to either copy the first text document from a source location to the destination location or store a reference pointer within the destination location that references the copy of the first text document within the source location). In addition, it may be determined that a second portion of the writeable data is not stored by the storage server (e.g., the storage server has not stored a copy of the second text document within a storage device). Thus, the second portion may be included in the deduplication result set, and a write command for the second portion may be specified within the deduplication result set (e.g., the deduplication result set may comprise the second text document, and may comprise an instruction for the storage server to write the second text document to the destination location). At 408, the deduplication result set may be sent to the storage server. At 410, the method ends.

Figure 5:
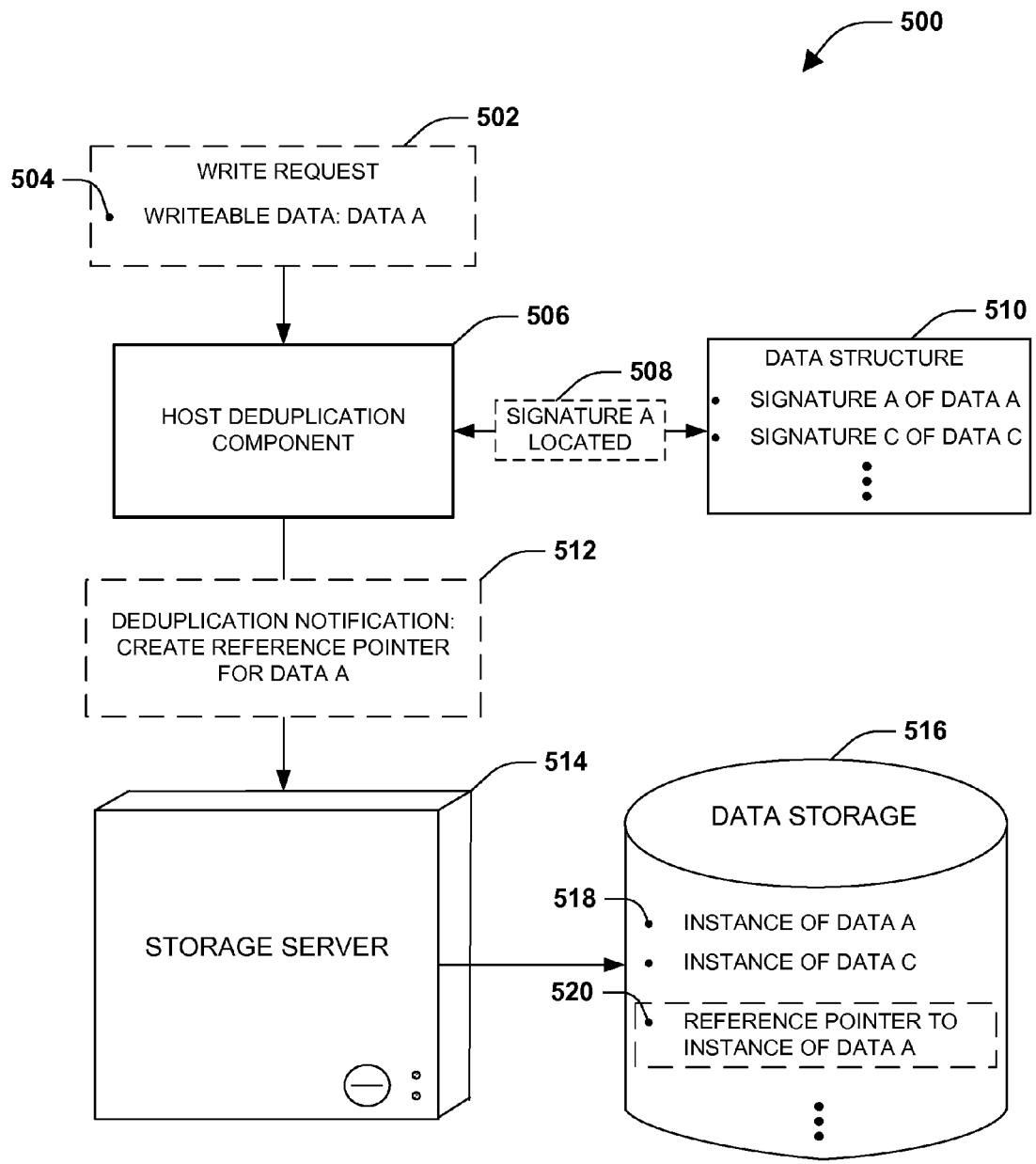
FIG. 5 is a component block diagram illustrating an exemplary system for performing host side deduplication.

FIG. 5 illustrates an example of a system 500 configured to perform host side deduplication. System 500 may comprise a host deduplication component 506 (e.g., the host deduplication component 506 may reside within a host computing device, such as client 108, 110 of FIG. 1 and/or 205 of FIG. 2). The host side deduplication component 506 may be configured to receive a write request 502 at a host computing device configured to access data stored by a storage server 514 (e.g., the storage server 514 may store data within data storage 516 comprised of one or more data storage devices). The write request 502 may be associated with writeable data (data A) 504 and/or a destination location (e.g., a user folder within data storage 516).

The host side deduplication component 506 may be configured to perform host side deduplication. In one example, the host side deduplication component 506 may compute a signature A for the writeable data (data A) 504. The host side deduplication component 506 may use the signature A to query a data structure 510 (e.g., an index comprising signatures associated with data stored by the storage server 514, such as signature A of data A and signature C of data C) to determine whether signature A is specified within the data structure 510. If signature A is not specified within data structure 510, then a write command comprising the writeable data (data A) 504 and an instruction for the storage server 514 to write the writeable data (data A) 504 to the destination location may be sent to the storage server 514. If a write command is sent, then the data structure 510 may be updated to reflect that writeable data (data A) 504 may have been stored by the storage server 514 based upon the write command.

If signature A is specified within data structure 510 (e.g., query result 508 may report that signature A is specified within data structure 510, which may indicate that an instance of data A 518 is stored by the storage server 514 within the data storage 516), then a deduplication notification 512 may be sent to the storage server 514. The deduplication notification 512 may exclude the writeable data (data A) 504 because the storage server 514 may already store the instance of data A 518 within the data storage 516. In one example, the deduplication notification may comprise an instruction for the storage server 514 to copy the instance of data A 518 from a source location to the destination location. In another example, the deduplication notification may comprise an instruction for the storage server 514 to create a reference pointer 520, at the destination location, referencing the source location comprising the instance of data A 518. In this way, the host deduplication component 506 may perform host side deduplication to offload deduplication processing by the storage server 514 and/or reduce network traffic of redundant data already stored by the storage server 514 (e.g., writeable data (data A) 504 was not (re)transmitted over a network to storage server 514). It may be appreciated that some or all of the data structure may be stored on the host and/or elsewhere.

In another example of performing host side deduplication, the host deduplication component 506 may be configured to compute a first data block signature associated with a first data block of the writeable data (data A) 504 (e.g., the first data block may comprise the entire writeable data (data A) 504 or a portion thereof). It may be appreciated that a size of the first data block may range from the size of the entire writeable data (data A) 504 to merely a portion of the writeable data (data A) 504 (e.g., a 4 KB data block of a 2 GB writeable data file). The host deduplication component 506 may compare the first data block signature to one or more data block signatures specified within the data structure 510 (e.g., the signatures specified within the data structure 510 may comprise data block signatures (as opposed to or in addition to signatures for entire writable data)). If the first data block signature corresponds to a second data block signature specified within the data structure 510, then the deduplication component 506 may perform a byte-by-byte comparison between the first data block of the writeable data (data A) 504 and an instance of a second data block associated with the second data block signature (e.g., the instance of the second data block may be maintained in a host side cache). In this way, if the byte-by-byte comparison (e.g., yields a match and thus) indicates that the storage server 514 may already store the writeable data (data A) 504 and/or the first data block of the writeable data (data A) 504, then a deduplication notification may be sent to the storage server 514, otherwise a write command may be sent to the storage server 415 (e.g., the deduplication notification and/or the write command may correspond to the writeable data (data A) 504 or merely the first data block).

Figure 6:
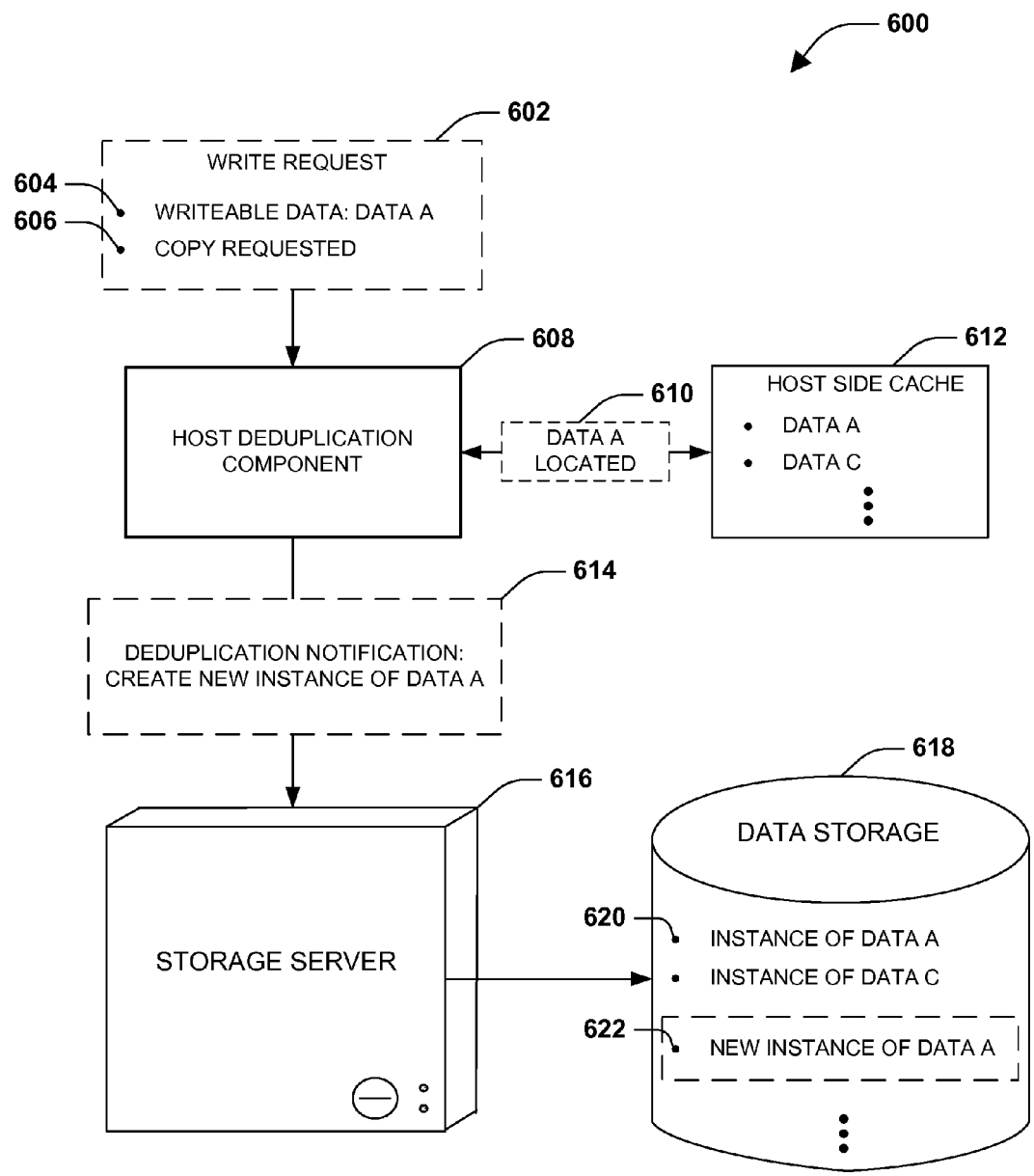
FIG. 6 is a component block diagram illustrating an exemplary system for performing host side deduplication.

FIG. 6 illustrates an example of a system 600 configured to perform host side deduplication. System 600 may comprise a host deduplication component 608 (e.g., the host deduplication component 608 may reside within a host computing device, such as clients 108, 110 of FIG. 1 and/or 205 of FIG. 2). The host side deduplication component 608 may be configured to receive a write request 602 at a host computing device configured to access data stored by a storage server 616 (e.g., the storage server 616 may store data within data storage 618 comprised of one or more data storage devices). The write request 602 may be associated with writeable data (data A) 604, a destination location (e.g., a user folder within data storage 618), and/or additional information such as a copy request 606 (e.g., a user may specify that the destination location is to comprise a new instance the writeable data (data A) instead of a reference pointer referencing an instance of the writeable data (data A) 620 already stored by the storage server 616).

The host side deduplication component 608 may be configured to perform host side deduplication. For example, the host deduplication component 608 may query a host side cache 612 to determine whether the writeable data (data A) 604 is stored within the host side cache 612. The host side cache 612 may comprise one or more instances of data stored by the storage server 616 (e.g., data recently accessed and/or frequently accessed by the host computing device). Cache consistency may be maintained between the host side cache 612 and the storage server 616. In this way, if the writeable data (data A) 604 is stored within the host side cache 612, then the storage server 614 may have already stored the instance of data A 620, otherwise the storage server 614 may not have already stored an instance of data A.

Upon determining writeable data (data A) 604 is stored within the host side cache 612 (e.g., query result 610 may report that data A is stored within host side cache 612, which may indicate that the instance of data A 620 is stored by the storage server 616 within data storage 618), a deduplication notification 614 may be sent to the storage server 616. The deduplication notification 614 may exclude the writeable data (data A) 604 because the storage server 614 may already store the instance of data A 620 within the data storage 616. The deduplication notification 614 may comprise an instruction for the storage server 616 to create the new instance of data A 622 based upon the copy request 606. Thus, the storage server 616 may create the new instance of data A 622 within the data storage 618. In this way, the host deduplication component 608 may perform host side deduplication to offload deduplication processing by the storage server 616 and/or reduce network traffic of redundant data already stored by the storage server 616 (e.g., writeable data (data A) 604 was not (re)transmitted over a network to storage server 616).

Figure 7:
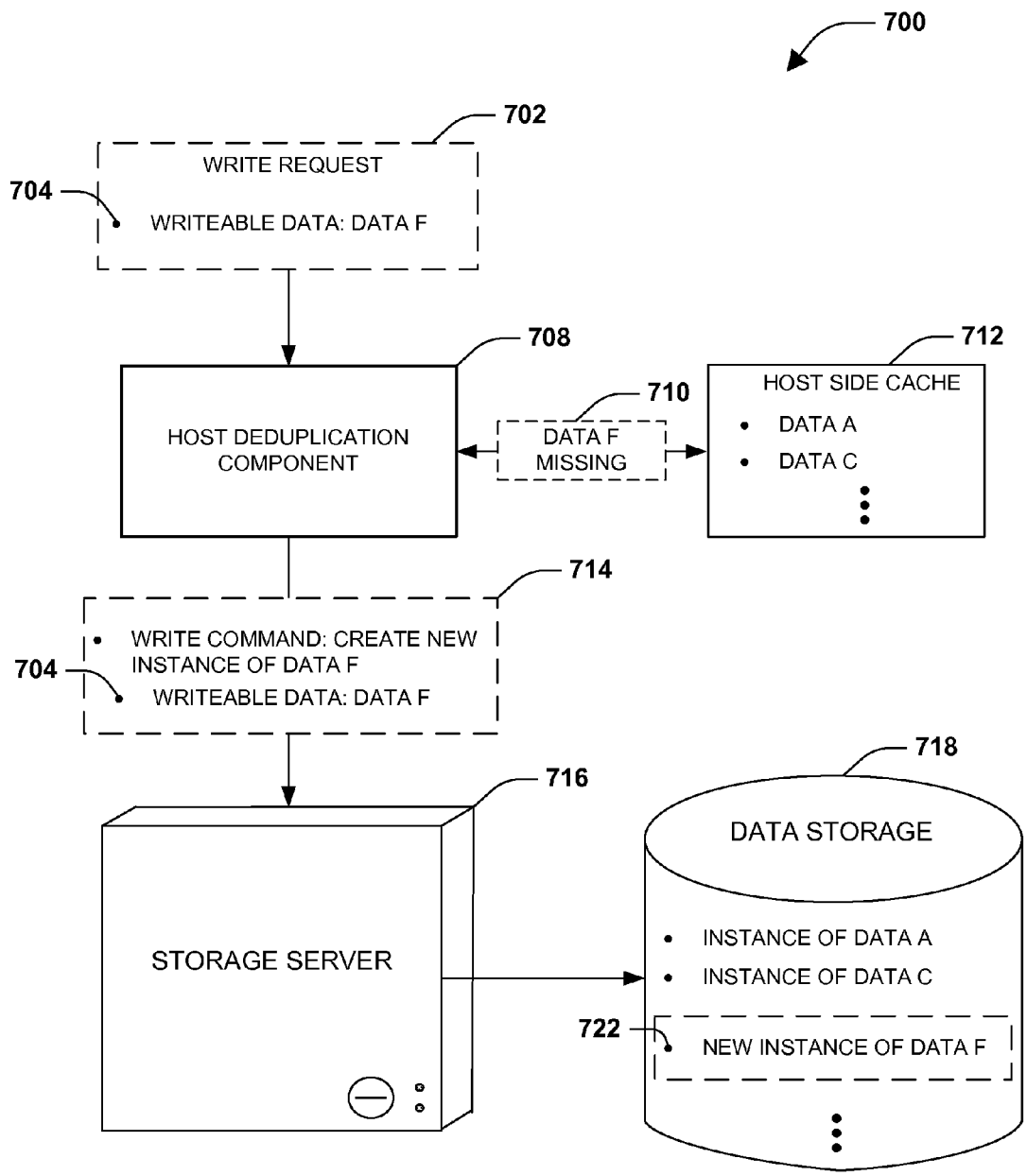
FIG. 7 is a component block diagram illustrating an exemplary system for performing host side deduplication.

FIG. 7 illustrates an example of a system 700 configured to perform host side deduplication. System 700 may comprise a host deduplication component 708 (e.g., the host deduplication component 708 may reside within a host computing device, such as clients 108, 110 of FIG. 1 and/or 205 of FIG. 2). The host side deduplication component 708 may be configured to receive a write request 702 at a host computing device configured to access data stored by a storage server 716 (e.g., the storage server 716 may store data within data storage 718 comprised of one or more data storage devices). The write request 702 may be associated with writeable data (data F) 704 and/or a destination location (e.g., a user folder within data storage 718).

The host side deduplication component 708 may be configured to perform host side deduplication. For example, the host deduplication component 708 may query a host side cache 712 to determine whether the writeable data (data F) 704 is stored within the host side cache 712. The host side cache 712 may comprise one or more instances of data stored by the storage server 716 (e.g., data recently accessed and/or frequently accessed by the host computing device). In this way, if the writeable data (data F) 704 is stored within the host side cache 712, then the storage server 716 may have already stored an instance of the data F, otherwise the storage server 716 may not have already stored an instance of data F.

Upon determining writeable data (data F) 704 is not stored within the host side cache 712 (e.g., query result 710 may report that data F is not stored within host side cache 712, which may indicate that an instance of data F is not stored by the storage server 716 within data storage 718), a write command 714 comprising the writeable data (data F) 704 may be sent to the storage server 716. The storage server 716 may create a new instance of data F 722 within data storage 718 based upon the write command 714. The host deduplication component 708 may update the host side cache 712 to comprise data F based upon the write command 714 because the storage server 716 may now store the new instance of data F 722.

Figure 8:
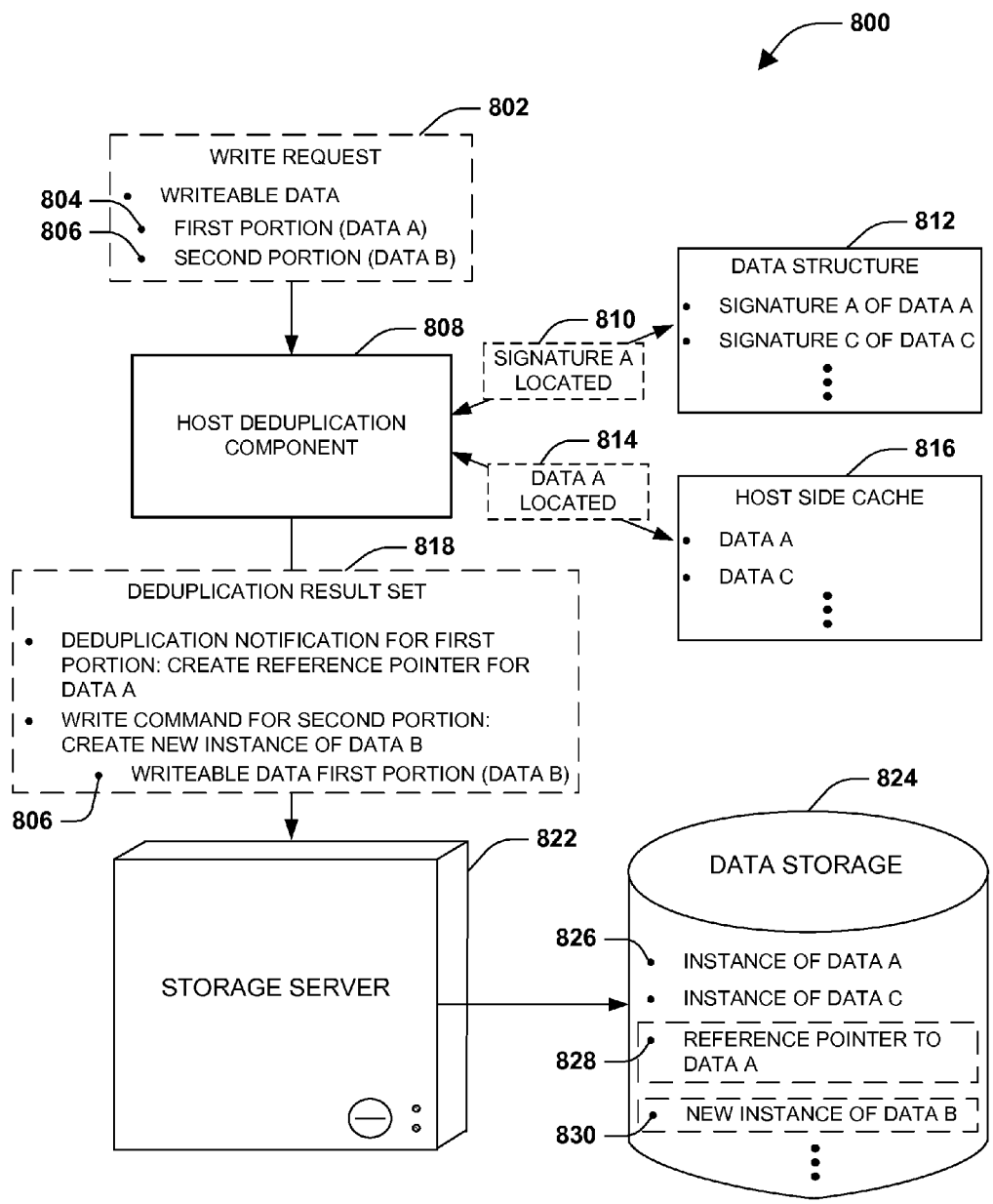
FIG. 8 is a component block diagram illustrating an exemplary system for performing host side deduplication.

FIG. 8 illustrates an example of a system 800 configured to perform host side deduplication. System 800 may comprise a host deduplication component 808 (e.g., the host deduplication component 808 may reside within a host computing device, such as clients 108, 110 of FIG. 1 and/or 205 of FIG. 2). The host side deduplication component 808 may be configured to receive a write request 802 at a host computing device configured to access data stored by a storage server 822 (e.g., the storage server 822 may store data within data storage 824 comprised of one or more data storage devices). The write request 802 may be associated with writeable data and/or a destination location. The writeable data may comprise a first portion (data A) 804 and a second portion (data B) 806.

The host side deduplication component 808 may be configured to perform host side deduplication to create a deduplication result set 818. The host side deduplication component 808 may utilize a data structure 812 comprising signatures associated with data stored by the storage server 822 and/or a host side cache 816 comprising instances of data stored by the storage server 822. For example, the host side deduplication component 808 may compute a signature A for the first portion (data A) 804, and may determine whether the signature A is specified within the data structure 812. Upon determining signature A is specified within the data structure 812 (e.g., query result 810 may report that signature A was located), the host deduplication component 808 may additionally query the host side cache 816 using the first portion (data A) 804 to determine whether the first portion (data A) 804 is stored within the host side cache 816. Upon determining signature A is specified within the data structure 812 and first portion (data A) 804 is stored within the host side cache 816 (e.g., query result 814 may report that data A was located), the host deduplication component 808 may specify a deduplication notification for the first portion (data A) 804 within the deduplication result set 818 and may exclude the first portion (data A) 804 from the deduplication result set 818. The deduplication notification may comprise an instruction for the storage server 822 to create a reference pointer 828 within the destination location that references an instance of data A 826 stored by the storage server 822.

The host side deduplication component 808 may determine whether second portion (data B) 806 is stored within the host side cache 816 and/or whether a signature B of the second portion (data B) 806 is specified within the data structure 812. Upon determining that the second portion (data B) 806 is not stored within the host side cache 816 and that the signature B is not specified within the data structure 812, the host deduplication component 808 may specify a write command for the second portion (data B) 806 within the deduplication result set 818. The write command may comprise the second portion (data B) 806 and an instruction for the storage server 822 to create a new instance of data B 830 within the destination location. Thus, the storage server 822 may create the new instance of data B 830 and create the reference pointer to data A 828 within the data storage 824. In this way, the host deduplication component 808 may perform host side deduplication to offload deduplication processing by the storage server 822 and/or reduce network traffic of redundant data already stored by the storage server 822 (e.g., first portion (data A) 804 was not (re)transmitted over a network to storage server 822).

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Figure 9:
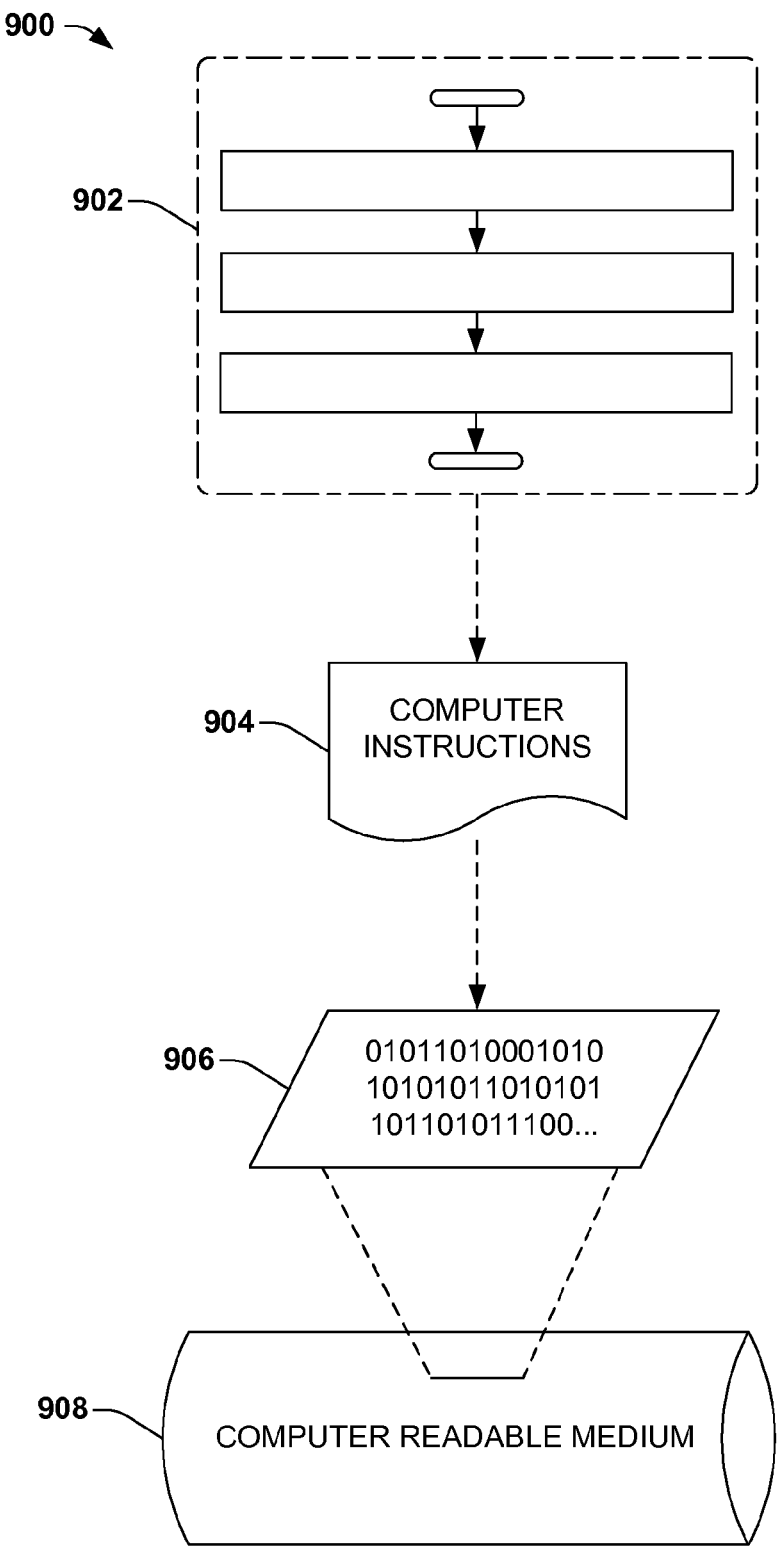
FIG. 9 is an example of a computer readable medium in accordance with one or more of the provisions set forth herein.

Another embodiment (which may include one or more of the variations described above) involves a (non-transitive) computer-readable medium comprising processor-executable instructions configured to apply one or more of the techniques presented herein. An exemplary computer-readable medium that may be devised in these ways is illustrated in FIG. 9, where the implementation 900 comprises a computer-readable medium 908 (e.g., a CD-R, DVD-R, platter of a hard disk drive, flash drive, etc.), on which is encoded computer-readable data 906. This computer-readable data 906 in turn comprises a set of computer instructions 904 configured to operate according to the principles set forth herein. In one such embodiment, the processor-executable instructions 904 may be configured to perform a method 902, such as at least some of the method 300 of FIG. 3 and/or method 400 of FIG. 4, for example, and/or at least some of a system, such as at least some of the system 500 of FIG. 5, for example. Many such computer-readable media may be devised by those of ordinary skill in the art that are configured to operate in accordance with the techniques presented herein.

Although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Furthermore, to the extent that the terms "includes", "having", "has", "with", or variants thereof are used in either the detailed description or the claims, such terms are intended to be inclusive in a manner similar to the term "comprising." Also, "exemplary" means an example, not the best; "or" is intended to be inclusive not exclusive; "a" and/or "an" mean "one or more" unless specified otherwise and/or clear from context to be directed to a singular form; and at least one of A and B and/or the like generally means A or B or both A and B.

What is claimed is:

1. A method comprising:
   receiving a write request at a host computing device for storing writeable data, wherein the host computing device comprises a non-volatile host side cache comprising one or more instances of data stored therein;
   determining whether the writeable data is stored within the non-volatile host side cache, by calculating a signature of the writeable data and comparing the signature of the writeable data to signatures of the one or more instances of data, wherein the signatures are stored in a data structure associated with the non-volatile host side cache;
   responsive to determining that the writeable data is stored within the non-volatile host side cache, sending a deduplication notification from the host computing device to a storage server associated with the non-volatile host side cache, wherein the deduplication notification excludes the writeable data and comprises an instruction for the storage server to create at a destination location a reference pointer to a source location, wherein the destination location is associated with the write request and the source location comprises an instance of the writeable data stored by the storage server; and,
   responsive to determining that the writeable data is not stored within the non-volatile host side cache, sending a write command comprising the writeable data to the storage server.

2. The method of claim 1, comprising:
   maintaining an index on the host computing device, the index derived from the non-volatile host side cache.

3. The method of claim 2, the querying the non-volatile host side cache comprising querying the index to determine whether the writeable data is stored within the non-volatile host side cache.

4. The method of claim 1, comprising: updating the non-volatile host side cache upon sending the write command to the storage server.

5. The method of claim 1, further comprising:
   receiving a second write request at the host computing device;
   determining whether the second writeable data is stored within the non-volatile host side cache;
   responsive to the second writeable data being stored within the non-volatile host side cache, the host computing device transmitting a second deduplication notification to the storage server, the second deduplication notification comprising an instruction for the storage server to copy the second writeable data from a second source location to a second destination location associated with the second write request.

6. A system for host side deduplication, comprising:
   a processor;
   a non-volatile host side cache;
   and,
   a computer-readable medium having instructions stored therein, the instructions executable by the processor to cause the system to:
   responsive to receipt of a write request for storing writeable data, determine whether the writeable data is stored within the non-volatile host side cache, by calculating a signature of the writeable data and comparing the signature of the writeable data to signatures of the one or more instances of data, wherein the signatures are stored in a data structure associated with the non-volatile host side cache;
   responsive to determining that the writeable data is stored within the non-volatile host side cache, send a deduplication notification for the write request to a storage server associated with the non-volatile host side cache, wherein the deduplication notification excludes the writeable data and comprises an instruction for the storage server to create at a destination location a reference pointer to a source location, wherein the destination location is associated with the write request and the source location comprises an instance of the writeable data stored by the storage server; and
   responsive to determining that the writeable data is not stored within the non-volatile host side cache, send a write command comprising the writeable data to the storage server.

7. The system of claim 6, the computer-readable medium further having stored therein instructions executable by the processor to cause the system to maintain an index on the host computing device, the index derived from the non-volatile host side cache.

8. The system of claim 7, the computer-readable medium further having stored therein instructions executable by the processor to cause the system to query the index to determine whether the writeable data is stored within the non-volatile host side cache.

9. The system of claim 6, the computer-readable medium further having stored therein instructions executable by the processor to cause the system to update the non-volatile host side cache upon sending the write command to the storage server.

10. The system of claim 6, the computer-readable medium further having stored therein instructions executable by the processor to cause the system to, responsive to writeable data of a second write request being stored within the non-volatile host side cache, the host computing device transmit a second deduplication notification to the storage server, the second deduplication notification comprising a second instruction for the storage server to copy the writeable data from a source location to a destination location associated with the second write request.

11. A non-transitory computer readable medium comprising computer executable instructions for maintaining a non-volatile host side cache hosted by a host computing device, for host side deduplication, the computer executable instructions to:
  responsive to receipt of a write request for storing writeable data, determine whether the writeable data is stored within the non-volatile host side cache, by calculating a signature of the writeable data and comparing the signature of the writeable data to signatures of the one or more instances of data, wherein the signatures are stored in a data structure associated with the non-volatile host side cache;
  responsive to determining that the writeable data is stored within the non-volatile host side cache, send a deduplication notification for the write request to a storage server associated with the non-volatile host side cache, wherein the deduplication notification excludes the writeable data and comprises an instruction for the storage server to create at a destination location a reference pointer to a source location, wherein the destination location is associated with the write request and the source location comprises an instance of the writeable data stored by the storage server; and,
  responsive to determining that the writeable data is not stored within the non-volatile host side cache, send a write command comprising the writeable data to the storage server.

12. The computer readable medium of claim 11, further having stored therein computer executable instructions to update the non-volatile host side cache upon sending the write command to the storage server.

* * * * *